United States Patent [19]
Burd

[11] Patent Number: 5,595,438
[45] Date of Patent: Jan. 21, 1997

[54] REFLECTIVE HYBRID LAMP ASSEMBLY

[76] Inventor: David M. Burd, P.O. Box 123, Bentonville, Va. 22610

[21] Appl. No.: 407,994

[22] Filed: Mar. 16, 1995

[51] Int. Cl.$^6$ ............................................. F21S 7/00
[52] U.S. Cl. ................... 362/228; 362/216; 362/276; 362/260; 362/240; 362/290
[58] Field of Search ............................ 362/228, 216, 362/240, 242, 260, 290, 276, 802, 227, 295; 315/60, 62, 64, 310, 311

[56] References Cited

U.S. PATENT DOCUMENTS

| | | | |
|---|---|---|---|
| 2,494,058 | 1/1950 | Ries et al. | 362/216 |
| 3,287,551 | 11/1966 | Vin Dick | 362/216 |
| 3,800,136 | 3/1974 | Edelson | 362/157 |
| 4,199,708 | 4/1980 | Lauwerijssen et al. | |
| 4,249,234 | 2/1981 | Park et al. | 362/228 |
| 4,399,492 | 8/1983 | Kolesar | 362/240 |
| 4,723,200 | 2/1988 | Troen | 362/260 |
| 4,751,624 | 6/1988 | Russo et al. | 362/802 |
| 4,833,574 | 5/1989 | Gallagher | 362/216 |
| 4,947,297 | 8/1990 | Druffel et al. | 362/147 |
| 5,130,910 | 7/1992 | Engel | 362/217 |
| 5,174,648 | 12/1992 | Clary et al. | 362/228 |

FOREIGN PATENT DOCUMENTS 54-131364  10/1979  Japan .............................. 362/228

Primary Examiner—Ira S. Lazarus
Assistant Examiner—Sara Sachie Raab
Attorney, Agent, or Firm—Larson & Taylor

[57] ABSTRACT

Multiple compact fluorescent annular lamps are arranged in complementary concentric fashion about a miniature tungsten-halogen light source. All lamping is combined with appropriate reflectors in a single assembly with internal controls so as to provide dimmable light, focused center light, and frigid weather illumination capability. Light output of high efficacy is produced by combining fluorescent technology and the versatility inherent in halogen incandescent technology. The annular fluorescent lamps are triangular or igloo-shaped in cross section and the associated reflector serves to redirect light from the base of the lamps.

20 Claims, 3 Drawing Sheets

REFLECTIVE HYBRID LAMP ASSEMBLY

BACKGROUND OF THE INVENTION

1. Field of the Invention

The present invention relates to lamps and lighting systems including floodlights, spotlights and the like.

2. The Prior Art

Incandescent reflective lamp assemblies known as floodlights and spotlights have been in universal use for many decades, their outputs directed according to their mounting in recessed ceiling fixtures or as adjusted in their swivel arrangements. Floodlights broadcast light evenly and widely whereas spotlights direct light in a smaller dispersion pattern with emphasis on a brightly illuminated center area known as a spot.

Recessed ceiling light fixtures are sometimes known in the trade as "highhats" while swiveled light fixtures are entirely exposed and are commonly called tracklights. The advent of small fluorescent tubing, known as compact fluorescent (CFL), in the 1980's allowed designers to enclose fluorescent technology within assemblies small enough to be installed in fixtures originally meant for incandescent flood/spotlights. Representative lights in the market in the United States are designated first by a letter(s) describing their shape followed by a number designating their diameter in one-eighths of an inch. Hence a PAR 38 lamp is a Parabolic Aluminized Reflective lamp four and three-quarters inches in diameter; an ER 40 would be an Ellipsoidal Reflector lamp five inches in diameter. In both of these examples, the light (lumen) output will vary by design according to a range of designed-in wattages varying by hundreds of watts.

In my copending patent application Ser. No. 08/302,469, there is a discussion of details prior art for reflective compact fluorescent (RCFL) lamps (i.e. U.S. Pat. Nos. 4,199,708, 4,833,574, 5,130,910, 4,723,200) that may in some cases replace incandescent flood/spotlight lamps, perhaps within the fixtures originally intended for the incandescents. Relamping with nine watt to twenty-six watt CFLs has been widespread, yet leaving much to be desired in five major areas.

The first and second major areas, weak lumen output and excessive outline dimensions, have been addressed my application Ser. No. 08/302,469, which discloses an invention that details differently shaped and oriented CFL tubing realizing dramatically high lumen output along with a finished assembly to match incandescent flood/spotlight spatial outlines. The reflective compact fluorescent (RCFL) lamp disclosed in the application solves these generalized performance and fit factors.

The third major area of needed improvement for RCFLs is with regard to their aesthetic distribution of light. Incandescent flood/spotlights utilizing small tungsten filaments positioned within parabolic or ellipsoidal reflectors easily direct light to achieve "pools" of light or desired "highlighting" of merchandise in retail stores. By contrast, CFL tubing, inherently requiring high amounts of surface area for fluorescing powders, cannot be focused to create the desired brighter center areas of light. For instance, though generally acceptable light levels are realized with CFL relamping in hotel lobbies, readability of newspapers may be sacrificed in the process without the focused light formerly provided by the original incandescents.

A fourth requirement for many users of recessed or track flood/spotlights is the capability of the lights to be dimmed for various purposes. Dimming of incandescent reflector lamps is easily and effectively accomplished by economical dimmer controls, sometimes called rheostats. As voltage to the incandescent light is lowered by the dimmer control, less amperage is drawn by the filament with a resulting lowering of emitted light. No harm is done to the incandescent lamp and its life is usually extended. Single, or multiple incandescent lamps on one circuit, are dimmed by a single inexpensive voltage control with no risk to the lamps. By contrast, CFLs and RCFLs, whether screw-in or handwired, have shown themselves to be extremely difficult and costly to be dimmed. Simple relamping, without adding additional system-wide wiring infra-structure, cannot achieve fluorescent dimming.

There are several reasons that dimmable retrofit RCFLs, whether screw-in or otherwise, are not in widespread consumer use. For a CFL to be dimmed without deterioration of its electrode elements, low voltage must be supplied and maintained to the elements to keep them heated while lamp arc voltage is reduced by another set of ballast connections. Only rapid-start type fluorescent lamps with four-pin two-circuit bases are capable of this, with the additional electrical system requirement demanding two separate voltages to be independently supplied to the original screw-in receptacle or hardwired fixture. New construction of buildings may include these two separate circuits at a reasonable cost, but this practice to date is virtually unimplemented. For the hundreds of millions, perhaps billions, of flood/spotlight fixtures in existing commercial buildings, retail stores and malls, and homes, retrofit of low voltage supply lines is financially prohibitive. Additionally, as dimmable rapid-start elements require constant amperage to keep them heated, even in the non-dimming mode, wattage is consumed and wasted with no gain in lumen output. As a significant secondary effect, this constantly heated filament technology also incrementally increases building air conditioning loads and costs.

A fifth area needing improvement for retrofit and new building RCFLs is higher reliability of even starting, and consequently, life expectancy of the lamp, under cold weather conditions. Flood/spotlights, in particular, are commonly used in conditions exposed to outdoor ambient temperatures. Many of these installations are in exterior walkways, hotel entrances, unheated garages, industrial sites, home and commercial security areas, and the like. Manufacturers of CFL products routinely warn against use of CFLs at temperatures from 32° down to 0° F. depending upon the manufacturer. Not being able to start at all is one problem, and at critical temperatures the high voltage arc will sputter and try to establish a mercury vapor in vain—the result being either an extremely shortened life of the lamp, or outright permanent failure. Incandescent, including (tungsten) halogen lamps are proven in extreme cold, in fact their hours of life are extended by the cold. Fluorescent technology, including CFLs, have been unable to match incandescents in this respect.

SUMMARY OF THE INVENTION

In accordance with the invention new reflective light technology is provided to optimize the energy-saving of CFLs in applications and locations as noted in the above five areas that CFLs designs to date have shown to be either inappropriate, or insufficient, or both, when compared lightwise to incandescent flood/spotlights. These goals are achieved by the present invention by using highly efficient tungsten-halogen technology in complementary fashion with CFL technology.

The invention disclosed in Ser. No. 08/302,469 successfully addresses the first two areas mentioned above, viz. lumen volume and spatial fit. That invention also provides a foundation for addressing and solving the next three areas of function desired by users: 1) concentration of light for either aesthetic or functional purpose, 2) dimmability of relamped lights at minimal cost, 3) cold weather use. The 1992 U.S. Energy Policy Act (Public Law 102-486), which becomes effective in October of 1995, prohibits the sale of the very popular 150 watt incandescent flood/spotlight, and recommends that 90 watt halogen flood/spotlights be the typical replacement. Many users have already changed to the 90 watt halogen spotlight for obvious reasons of economy, yet many are unsatisfied with total lumen output, as the 90 watt halogen delivers about 30% less lumen than the widely used 150 watt R40 and PAR 38 incandescent lamps (1260 lumens for the 90 watt halogen versus 1900 lumens for the R 40 and 1730 lumens for the PAR 38). This invention combines the best of two efficient lighting technologies, viz., highly efficient compact fluorescent with its capability of use in small spaces, and the proven capabilities in dimming and focusing of tungsten-halogen lamps.

Tungsten-halogen lamps are an advancing technology along with CFLs. Halogen lamp efficacies are approaching 38 lumens per watt, compared to standard incandescent efficacies of approximately 10 lumens per watt, both wattages being measured in the 30 watt range. This 30 watt range is important as the purpose of the present invention is to utilize tungsten-halogen in this lower range where conventional incandescent lighting is very inefficient. The U.S. Department of Energy's *"Advanced Lighting Guidelines"* 1993 gives the reason that halogen technology has achieved an efficacy of 38 lumens per watt; ". . . energy radiated by incandescent lamps, including tungsten-halogen, is (90%) invisible infrared heat . . . this IR energy can be indirectly converted to light through the application of a dicroic film coating to the tungsten-halogen lamp . . . This coating consists of several layers of a micron-thin optical material. The coating reflects heat energy back onto the lamp filament while allowing visible light to pass through the bulb wall. The reflected infrared, in turn, heats the tungsten element." . . . "efficacy can be increased to 32–38 lumens per watt by the application of infrared reflecting film to the bulb wall."

The annular CFL tubing of co-pending application Ser. No. 08/302,469, ringing the perimeter of a reflector housing in the size of typical incandescent lamps provides an ideal space for the inclusion of a small "bud" halogen bulb to be centered with its own reflector in the middle of this hybrid assembly. For instance, halogen lamps widely used today, in the 20 to 30 watt range, use reflectors 1.46 inches in diameter, or 1.65 square inches, compared to the PAR 38 area of 17.65 square inches. Other halogen bulbs are manufactured in tubular shapes, adaptations of that form being possible to fit in small parabolic trough reflectors in the center portion of the hybrid assembly. In any of the possible variations the halogen technology requires space of such a minimal nature that light emitted by the annular fluorescent lamps is still efficiently transmitted out of the flood/spotlight's housing. Halogen technology has proven itself to be dimmable as in ordinary incandescents, unrestricted in cold weather applications, and easily focusable with very small reflectors, at 120 volt a/c, as well at lower direct voltages. The purpose of the present invention is to create a new RCFL/Halogen Hybrid, combining the capabilities of both technologies to create a new device with many economical and versatile uses, to satisfy demands that neither technology can supply by itself.

A significant share, perhaps half, of RCFL/Halogen applications would be in interior locations with no dimming or low temperature requirements, such as department stores, smaller retail stores, office building lobbies, etc. These sites often require highlighting and aesthetic pools of light so there is no need to have internal dimming electronics within RCFL/Halogen design. The ballast for the fluorescent tubing has ample room to be packaged on a circular printed circuit board with a space in the middle to leave room for the halogen lamp socket. Both lamps would go on and off together and operate at 120 vac, and the halogen reflector could have a reflector range of narrow to wide depending upon the particular use.

A large share of RCFL/Halogen users would use dimming capability provided in another version of the integrated hybrid. The overall configuration of the hybrid would remain in the same though the internal space of the assembly under the main reflector would have some additional control components. Users requiring dimmable RFCL/Hs include most rooms in residential housing, office conference rooms, restaurants, hotel conference rooms and the like.

There are many techniques available for dimming the dimmable hybrid lamp (RCFL/H,D). Two techniques will be discussed here. The first would be to combine annular lamping described in Ser. No. 08/302,469 with 22 CFL lamp watts, at net efficacy including ballast of 60 LPW, producing 1430 lumens. With control voltage above 120 vac only the CFL lamp produces light, with the halogen center lamp not switched on. When a wall control reduces the ac line voltage to below 112 vac, an internal sensing circuit contained in the RCFL/H,D switches the line voltage from the CFL ballast over to the previously unused halogen lamp. This halogen lamp, of perhaps 33 watts, now produces with an efficacy of 30 lumens per watt (LPW), therefore emitting 990 lumens from the hybrid assembly. The beam spread of the halogen can be selected at purchase to be wide or narrow depending upon the user's application. It should be emphasized that both light sources, the CFL and the halogen, have color temperature of 3000 Kelvin so they make an ideal color match. From fixture energy-use evaluation it can be seen that the hybrid RCFL/H,D uses a maximum of 33 watts compared to a standard 90 watt halogen reflector lamp, yet may usually be operated at only 24 watts (22 w for the lamp, 2 w for the ballast) while producing more overall lumens: 1430 lumens versus the standard halogen's 1260 lumens.

A second version of the RCFL/H,D (and there are many more desirable combinations) is a relatively high powered and high lumen output arrangement consuming 44.5 watts at 120 vac with a combined lumen output of 1,965. This would consist of 840 lumens by a 28 watt center halogen reflector, and 1,125 lumens by the annular CFL lamping—15 watts for the lamp and 1.5 watts for the ballast. The net efficacy for this high-powered version is 43.9 LPW versus the standard halogen reflector of 14 LPW. Of course, in a lighting renovation, two RCFL/H,D hybrids could take the place of three 90 watt PAR 38 halogens. Again, a simple self-contained line voltage sensing circuit is used; when a wall control lowers the line voltage to below 112 vac, the internal ballast line supply is turned off and only the halogen light remains on, ready to be further dimmed if desired from its starting point of 840 lumens.

For these examples, the 112 volt line voltage was selected to be well below the 120 volts supplied by the typical utility. It may be said that utility voltages virtually never drop below 115 V even under severe summer heat conditions. One of the reasons the 115 volt limit is seldom even approached is the implementation over the last five years of Demand Side Management (DSM) programs that curtail power in a sophisticated fashion, sequentially cutting power to air conditioning systems and other appliances throughout service areas in order to keep line voltage from dropping even a few volts.

Extreme cold weather can be dealt with by the RCFL/H,D hybrid. One embodiment would be a 37 watt hybrid utilizing 21 watts of halogen producing 630 lumens and 14 watts of CFL producing 900 lumens, plus 2 watts of ballast power consumption, producing a total of 1540 lumens above a set example temperature of 20° F. When the temperature drops below 20° F., an internal thermoswitch disconnects power to the CFL ballast and the fluorescent lamp is protected. Available lumens drop to 630 but this is directed like all reflector lights toward walkways, etc., and can be tested to see if this lighting level is adequate or not. If not, versions of the hybrid that produce more lumens than this example (when the CFL is off below 20° F.) could be substituted.

Another cold weather version is particularly useful when high light output is not necessary (in contrast to the 1540 lumens of the first example). For locations requiring 1000 lumens or so, only the CFL lamp, of 15 watts with lumen output of 975 would be usually on. At a temperature of, for example, about 20° F., the thermoswitch would disconnect the CFL and turn on the halogen lamp of 28 watts, for an output of 840 lumens. This version may be preferred largely on the basis that the halogen lamp bulb would only be used in winter, thereby giving it life expectancy equal to the CFL. Many locations have become considerably overlit at night, so the examples given would arguably not be a problem in practice—human eyes have great capacity for adjusting to transient dim conditions, particularly if it means walking briefly under an entranceway or the like.

It will be understood from the foregoing discussion that despite the dramatic efficacy gains provided by fluorescent light over the last 14 years, brought about by compact (CFL) tubing, improved phosphors, and high frequency ballasts, this technology has demonstrated severe limitations when tried as an all-around replacement for incandescent reflector lamps. Conventional lengthy fluorescent tubes, enclosed in small reflector envelopes, cannot supply focused light as incandescent technology can; cannot be economically dimmed, because additional low voltage electrical infrastructure is required at each lamp fixture, as incandescent reflector lamps can; and cannot perform adequately in frigid temperatures, because the enclosed gas is too cold to sustain the ionized mercury vapor at startup thus either not starting at all or drastically shortening electrode life by repeated arcing attempts. As stated, total CFL lumen output and spatial fit to match incandescent lighting have been addressed in co-pending application Ser. No. 08/302,469.

The novel architecture of the lamp devices of that application allows a solution to the above limitations, drawing upon advances of miniaturized incandescent tungsten-halogen lighting technology. According to the present invention, a novel complementary design is provided incorporating, in concert, the advances of both compact fluorescent (CFL) and tungsten-halogen technologies. Annular CFL tubing, located in the outer confines of a, e.g., five-inch, envelope, is used as a source of dispersed light generated at a high CFL efficacy, and provides a large open center area normally filled by conventional CFL tubing of typical twin, quad, or u-shaped form. In accordance with the invention, efficient miniature tungsten-halogen technology in reflective housing form is located in the open center expanse of the assembly and utilized to do what the CFL cannot perform alone: focus light as desired; be dimmed as desired with simple existing wall controls; and be functional in frigid temperatures with jeopardizing the CFL's life. Coordinated together, the halogen and CFL lamps create a novel hybrid reflective light source that is effectively substituted, without electrical infrastructure changes, in fixtures originally meant for incandescent floodlights and spotlights, and for one-technology tungsten-halogen spotlights.

Spatial requirements of packaging for both technologies, including the CFL ballast and voltage sensing/control electronics, are easily provided by architecture created by the invention of Ser. No. 08/302,469, as annular tubing creates a wealth of design volume within a typical incandescent envelope.

The halogen lamp supplies focused light, integrated with the CFL's dispersed light at full voltage. Utilizing simple self-contained voltage sensing/switching components the CFL tubing and ballast are safeguarded when the voltage is user-lowered below typical utility line fluctuations. When line voltage is purposefully lowered by a user, only the halogen remains switched on, to be dimmed further as desired. Cold weather versions, containing a thermoswitch, allow only the halogen lamp of the hybrid to be operated below proscribed design temperatures, without possible damage to the CFL lamp.

Other features and advantages of the invention will be set forth in, or apparent from, the following detailed description of preferred embodiments of the invention.

DETAILED DESCRIPTION OF THE DRAWINGS

Figure 1:
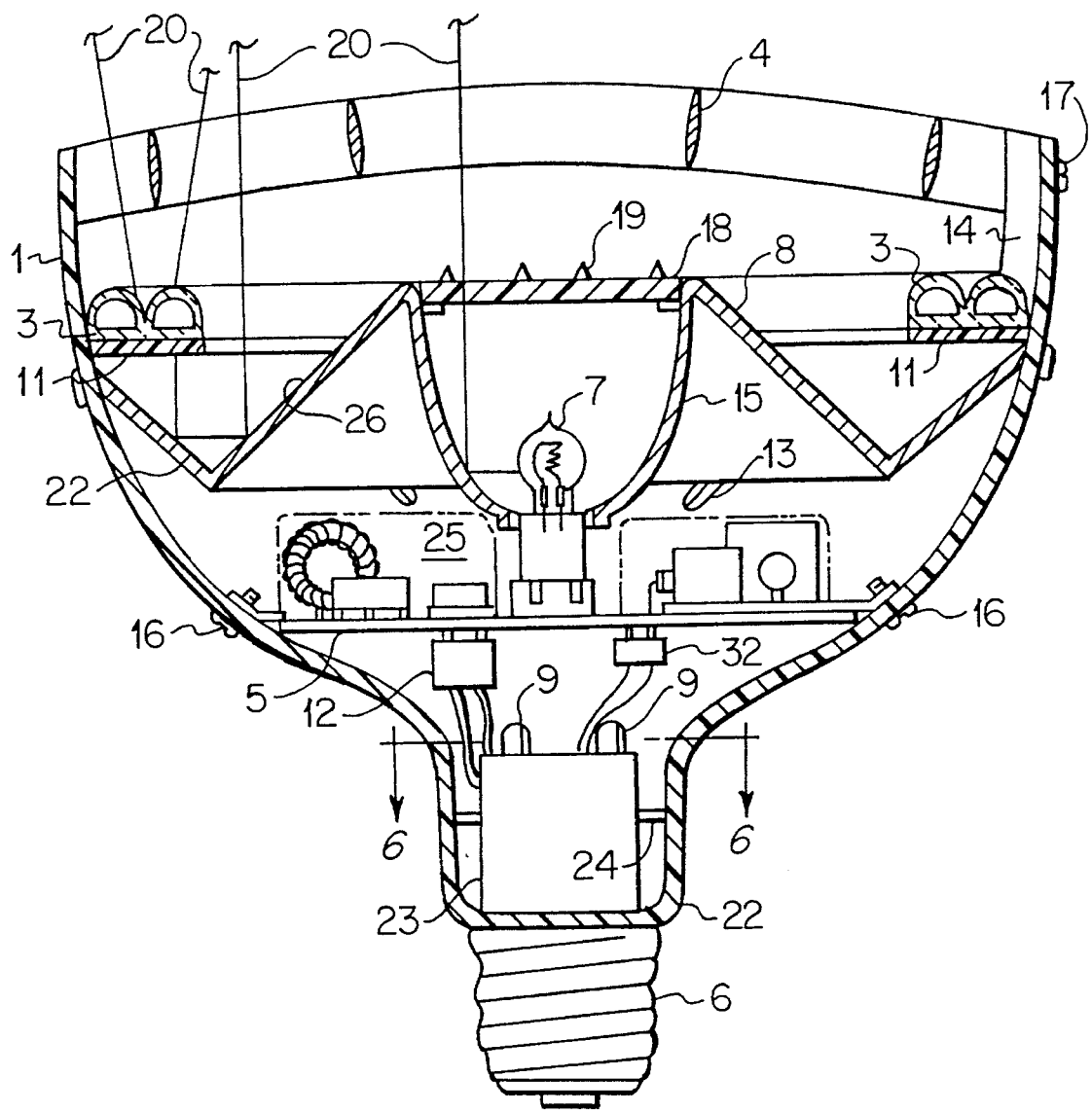
FIG. 1 is a side elevation view, in section, of one preferred embodiment of the reflective hybrid lamp assembly of the invention.
Figure 2:
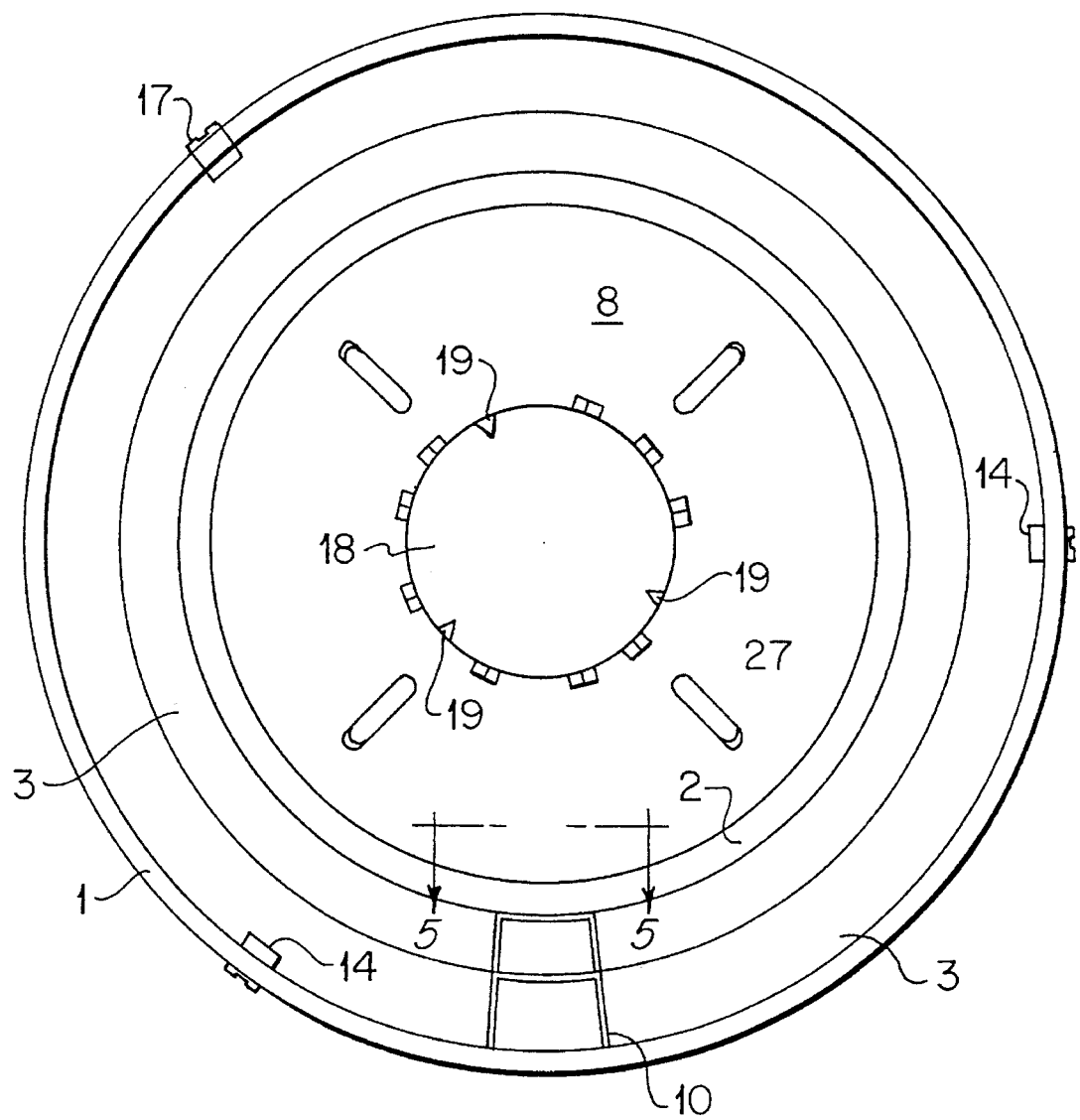
FIG. 2 is a top plan view of the assembly of FIG. 1.
Figure 5:
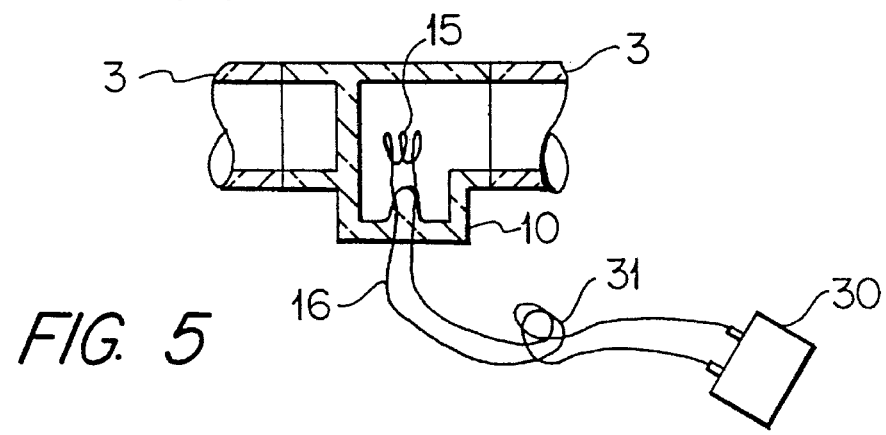
FIG. 5 is a cross sectional view taken generally along line 5—5 of FIG. 2.

FIGS. 1 and 2 illustrate the overall assembly and how all the major components thereof are arranged in a housing 1. Housing 1 is typically about five inches in maximum diameter which is the size of one of the most common lamps, used for decades, the R40 lamp. As there are certainly hundreds of millions, probably more than several billion fixtures in place in the United States designed to accommodate the R40 five inch diameter outline it is vital to not exceed that diameter for a screw-in embodiment. Also important to the outline is the provision of a neck 22 with a diameter also within the constraints of typical incandescent R40 and PAR38 lamps. An Edison medium base 6 fits well within the height, or mean overall length (MOL) of the aforementioned incandescent lamps. Together, housing 1 with neck 22 attached to screw-in base 6 comprise the overall outline to closely mimic the incandescent and halogen floodlights and spotlights, one embodiment for which this invention is created. It is to be noted that neck 22 has ample room for a serviced wire loop leading to printed circuit board 5. Though FIG. 1 does not show any components installed in neck 22, it is obvious to those skilled in the art that an electrical relay, a thermoswitch, or other device can easily be accommodated within its hollow structure. Properly positioned and fixed in place with obvious means, components in neck 22 allow heat convection to take place through slots 9. FIG. 5 shows a cylindrical component 23 located in neck 22 with tabs 24 holding it in position in neck 22. Component 23 is described in more detail below.

Printed circuit board 5 is shown being securely held to housing 1 by screws 16. In place of screws 16 it is obvious that rivets (not shown) could also be used for permanent assembly as it is anticipated that only lamps 7 and 3 described below would be replaceable. The overall ballast unit is shown by dashed lines in FIG. 1 and comprises potting compound 25 shown encompassing representative individual components on the printed circuit board 5. It is obvious that the printed circuit board, whether square or circular in shape, has an ample area to hold all necessary electrical components, with the possible exception of component 23 located in neck 22. Though not shown it is also obvious that the large expanse of board 5 can accommodate throughholes for air circulation and heat transfer. A representative circular board 5 three inches in diameter offers 7.02 square inches of x surface area for the electronic ballast, providing ample area for holes that could be used for convecting air.

FIG. 1 shows a connector 12 for input power from base 6 to board 5. To those skilled in the assembly art it is obvious that connector 12 may have several extra inches of service wiring for ease of assembly. Component arrangement on board 5 may be potted with compound 25 in a toroidal shape to allow the plugging and unplugging of a halogen lamp assembly 15 described below. Replacement of the halogen bulb 7 of lamp assembly 15 is expected to be several times as often as the lamp formed CFL tubing 3, although this would depend on the user's operation. For this hybrid lamp used in the mode that both lamps are always on together (as in department stores), the life of the CFL lamp 3 would be perhaps eight times that of the halogen's life of 2,000 to 3,000 hours, which is the general life expectancy also of 90 watt halogen spotlights used today. Replacing bulb 7 in halogen assembly 15 necessitates unscrewing the overall assembly from its socket.

For UL approval, a glass cover 18 is employed and held in place by tabs 19, several of which are shown bent over in FIG. 2. Tabs 19 are an integral part of the halogen's reflector body 15, which is made of malleable material such as aluminum with its interior surface created to reflect the light emitted from lamp bulb 7. Many tabs 19 are provided in a sawtooth pattern with only three used to hold transparent glass 18 at any one time.

As noted previously tungsten-halogen incandescent technology is capable at present of an efficacy of 38 lumens per watt. In a reflective manifestation there are losses that would lower this efficacy to under 32 lumens per watt so it is important that the UL required glass cover 18 transmit light efficiently in a desired range of 96% or greater. Cover 18 is quite small, about one and one-half square inches, and as a mass produced product can very economically be coated on both sides with anti-reflecting materials only microns thick using vacuum deposition techniques. A few cents spent in this manner results in correspondingly lower wattage required by halogen bulb 7. As evidenced by the U.S. Dept. of Energy's Advanced Lighting Guidelines: 1993, it is expected that this innovative hybrid lamp may achieve a halogen efficacy of 30 lumens per watt. If, for reasons of cost, lower efficacy in the range of 25 lumens per watt becomes standard, the overall principles of the present invention do not change and wattages are slightly adjusted as required. As bulb 7 requires a number of replacements vis-a-vis the expected life of the CFL ballast and lamp 3 is it anticipated that tabs 19 may be fatigued and broken but with many spares to be used. The preferred embodiment of the invention would provide that only bulb 7 be replaced, not the entire halogen assembly 15.

For users that employ this invention in the dimming mode it cannot reliably be predicted the percentage of time only the CFL lamp 3 is powered in the non-dimming mode as opposed to the amount of time that only the halogen lamp 7 is used in the dimming mode, with the CFL ballast unit 8 and lamp 3 being switched off for protection from undervoltage. Dimming mode would vary greatly depending upon the user; for example, conference rooms requiring dimming capability in fact are dimmed only a small portion of the time; restaurants, may dim their lights only at dinner hours and later but not at all for breakfast and lunch times. Home users vary greatly in habits also but it may generally be said that the majority of use would be in the non-dimming mode with only the CFL lamping being employed. In these numerous and varied situations it may be that an average of only two halogen bulbs 7 are used for the life expectancy of one CFL lamp 3, and even in some cases the halogen bulbs may outlive the CFL lamp 3.

FIG. 1 also shows a transparent collimating ring 11. Collimating ring 11 may be of several different optical designs, all of which are to collimate the light emitted from the base(s) of the CFL lamping 3 as much as possible so as to direct the light by means of reflecting surfaces 2 and 26 outward from the hybrid lamp. The corresponding light rays produced using reflecting surfaces 2 and 26 are denoted 20, as are the rays emitted by the upper surfaces of CFL lamp 3 and halogen lamp bulb 7.

Figure 3A:
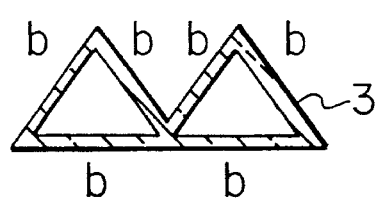
FIGS. 3(a) and 3(b) are cross sectional views of multiple, half-round or igloo shaped fluorescent tubing and multiple triangular tubing, respectively.
Figure 3B:
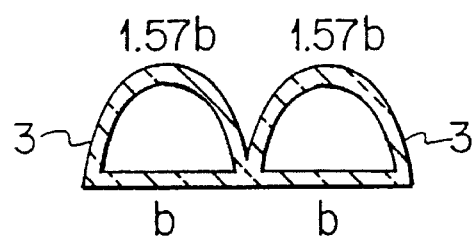
Figure 4A:
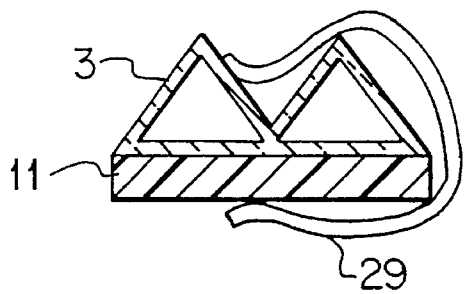
FIG. 4(a) and 4(b) are cross sectional views similar to FIGS. 3(a) and 3(b) illustrating a preferred assembly technique.
Figure 4B:
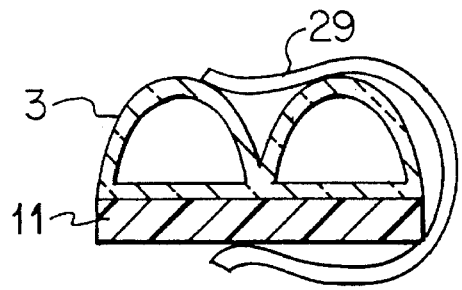

A technique of holding the CFL lamps 3 in close proximity to collimator 11 are shown in FIGS. 3 and 4(a) and 4(b), although many other techniques may be employed by those experienced in assembly of mass produced products. Several types of inexpensive springwire clips are shown at 29 for holding CFL tubing 3 to collimator ring 11. Element 14, of which three are shown in FIG. 2, is a lamp retainer held in place by screws 17. Many other diverse ways are available to mount the CFL lamp 3 and retainers 14 are but one way.

FIGS. 3(a) and 3(b) and FIGS. 5, 4(a) and 4(b) show two configurations of CFL tubing 3. In application Ser. No. 08/302,469, there are disclosed multiple annular triangular shapes such as shown in FIGS. 3(a) and 4(b). Also efficacious in emitting light are multiple half-round or igloo annular lamps shown in FIGS. 3(b) and 4(b). The latter may be purpose-fully selected by designers to emit less light at a lower wattage than the triangular geometry.

Economy of mass-produced design products depends upon interchangeability of parts—in this case the CFL lamp 3 in either the triangular or igloo versions—so other mating parts such as housing 1, collimating ring 11, and reflector 2 remain single inventory items that interchangeably fit with either type of CFL lamping. For this reason, both lamp configurations would have the same annular diameter and the identical base dimension "b" as shown in FIGS. 3(a) and 3(b). It will be seen that the perimeter of the triangular version is $b \times b + b = 3b$, while that of the igloo version is $b + \frac{1}{2}\pi b = 2.57b$. As light emitted is a function of the internal perimeters of the CFL tubing, thus the respective areas of fluorescing powder, it becomes apparent that the triangular configuration generates about 16.7% more light and needs more wattage to do so. It should be noted here that the multiple igloo version of FIGS. 3(b) and 4(b) has mutually beneficial light reflection similar to the triangular shapes, with light generated from the base of the geometry significantly less then the amount of light generated from the top perimeter, 1.00b versus 1.57b.

In order to have multiple annular tubing fit adjacent to each other without gaps, as is desired for precise assembly, the preferred embodiment would be extruded from molten glass tank as a contiguous unit with shared vitreous material, with another benefit being less pieceparts and less assembly labor called for. Element 10 in FIG. 5 is a separately manufactured electrode assembly that also has compartments to join the two annular channels to create a single tube, thus creating an economical assembly. FIG. 5 also shows electrode wires 16, service coil 31 and connector 30 that plugs into a mating connector, not shown, coming from printed circuit board 5.

FIG. 1 also shows front grate 4 employed as a means to partly baffle light so to prevent direct glare from the CFL tubing. Grate 4 may also be of various color tints for particular applications. Many techniques are available to hold grate 4 in place, elastic clips (not shown) being one. Another function of grate 4 is to provide some protection against physical damage to lamping 3.

Ability to convect heat through the hybrid assembly is important, particularly as halogen bulb 7 is not as efficient as the CFL 3 in converting wattage into useable light. It is expected that approximately 80% of wattage consumed by the halogen lamp 7 will be given off as heat. Housing 1 may have slots 17 as partially shown in FIG. 1 and reflector 8 may have slots 27 as shown in FIG. 2. As mentioned above, air convection slots 9 are provided in neck 22. The hybrid assembly has built-in protection for the CFL ballast when the hybrid is in the dimming mode, as the CFL ballast goes to an unpowered status when the halogen lamp 7 is activated for the dimming. There is at least one version of the hybrid device in which both lamps operate simultaneously, in particular the retail store version. It is anticipated that this retail store version will have a relatively small wattage halogen bulb in the range of 15 watts and its light will be well focused in a narrow angle to highlight merchandise. Properly designed for this mode, the hybrid's CFL ballast would not be overheated, particularly as indoor retail store use allows numerous cooling air convection slots without exposure to outdoor conditions. To match today's typical 90 watt halogen lumen output of 1,260 lumens, a hybrid of 14 watts of CFL at an efficacy of 65 LPW and a 15 watt halogen at an efficacy of 25 LPW produces a combined output of 1,360 lumens, consuming a mere 30.5 watts (including ballast consumption). The hybrid example will be more efficient by a factor of 3 than today's 90 watt halogen and have the highlighting function as desired by retailers and others.

Figure 6:
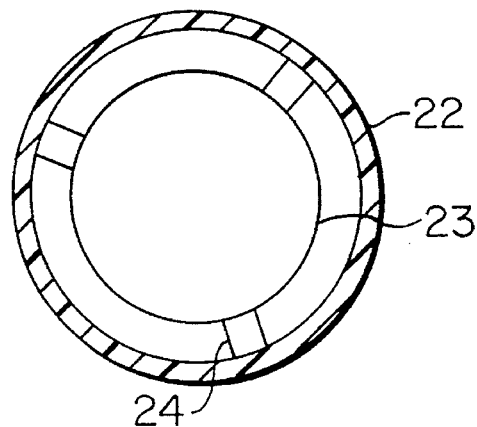
FIG. 6 is a cross sectional view taken generally along line 6—6 of FIG. 1.

FIG. 6 shows component 23 held centered in neck 22 by positioning tabs 24. For different versions of this invention this component 23 may perform different functions. One function would be to act as a temperature sensing switch for controlling power to either the CFL lamping 3 or to the halogen lamp assembly, or both, depending upon the application and frequency of low temperatures. Connectors 12 and 32 of FIG. 1 include wiring leading to component 23. When component 23 is included, it is attached electrically to the Edison base 6 by soldered connections (not shown, as this is an obvious assembly technique to those skilled in the art).

Although the present invention has been described relative to specific exemplary embodiments thereof, it will be understood by those skilled in the art that variations and modifications can be effected in these exemplary embodiments without departing from the scope and spirit of the invention.

What is claimed is:

1. A fluorescent lamp device comprising a housing including a light outlet opening, at least two annular fluorescent lamp tubes disposed in concentric relation in said housing adjacent to each other in a substantially common plane so as to define a central space inwardly thereof within said housing, said lamp tubes each being of a shape, in cross section, of a substantially semicircular portion having an apex and being joined to a substantially flat base, said apex of said semicircular portion being directed toward said outlet opening and said device further comprising reflector means for directing light emitted from a region of said base through said central space and out through said outlet opening.

2. An apparatus as claimed in claim 1 wherein said housing includes an Edison medium screw-in base.

3. A device as claimed in claim 1 wherein the bases of said tubes are contiguous.

4. A device as claimed in claim 1 wherein adjacent corners of said tubes are joined together so that the tubes form an integral structure.

5. A device as claimed in claim 1 wherein said reflector means is W-shaped in cross section and includes an outer frusto-conical reflector surface disposed to receive light emitted from the region of the base of said tubes and an inner conical reflector surface disposed to receive light from said outer reflector surface and to direct light received from said outer reflector surface through said central space.

6. A device as claimed in claim 5, wherein the tubes have sides and said inner conical reflector surface includes an apex located at a level with the sides of the tubes.

7. A device as claimed in claim 1 further comprising a transparent collimating ring for collimating the light from the region of the bases of said tubes.

8. A device as claimed in claim 1 wherein said housing further contains a ballast connected to said lamps.

9. A device as claimed in claim 1 further comprising a grating disposed in the outlet opening of said housing.

10. A device as claimed in claim 1 further comprising an incandescent light source disposed within said central space.

11. A device as claimed in claim 10 wherein said incandescent light source comprises a tungsten-halogen lamp.

12. A device as claimed in claim 10 further comprising further reflector means for reflecting light produced by said incandescent light source towards said outlet opening.

13. A fluorescent lamp device comprising a housing including a light outlet opening, at least two annular fluorescent lamp tubes disposed in concentric relation in said housing adjacent to each other in a substantially common plane so as to define a central space inwardly thereof within said housing, said lamp tubes each being of a shape, in cross section, of a triangle having an apex and a substantially flat base, said apex of said triangle being directed toward said outlet opening and said device further comprising reflector means for directing light emitted from a region of said base through said central space and out through said outlet opening, said device further comprising an incandescent light source disposed within said central space.

14. A reflective hybrid lamp assembly comprising a housing having a light outlet, a plurality of annular fluorescent lamps mounted within said housing so as to define a geometric center, reflector means mounted within said housing for reflecting light produced by said lamps towards said light outlet, an incandescent light source and associated reflector located in close proximity to the geometric center of said fluorescent lamps such that the lamps encircle the light source, and control means for separately and selectively controlling dimming of said incandescent light source, said lamps being triangular in cross section.

15. A reflective hybrid lamp assembly comprising a housing having a light outlet, a plurality of annular fluorescent lamps mounted within said housing so as to define a geometric center, reflector means mounted within said housing for reflecting light produced by said lamps towards said light outlet, an incandescent light source and associated reflector located in close proximity to the geometric center of said fluorescent lamps such that the lamps encircle the light source, and control means for separately and selectively controlling dimming of said incandescent light source, said lamps having a semicircular shape in cross section.

16. An assembly as claimed in claim 15 wherein said incandescent light source comprises a tungsten-halogen lamp.

17. An assembly as claimed in claim 15 further comprising means for energizing said lamps and said light source simultaneously so as to provide general light dispersion and center light concentration.

18. An assimbly as claimed in claim 15 wherein said housing includes an Edison, medium screw-in base.

19. A reflective hybrid lamp assembly comprising a housing having a light outlet, a plurality of annular fluorescent lamps mounted within said housing so as to define a geometric center, reflector means mounted within said housing for reflecting light produced by said lamps towards said light outlet, an incandescent light source and associated reflector located in close proximity to the geometric center of said fluorescent lamps such that the lamps encircle the light source, control means for separately and selectively controlling dimming of said incandescent light source, and temperature sensing means, connected to said fluorescent lamps, for sensing ambient temperature and for deactivating said fluorescent lamps when the ambient temperature sensed by said temperature sensing means falls below a predetermined value.

20. A reflective hybrid lamp assembly comprising a housing having a light outlet, a plurality of annular fluorescent lamps mounted within said housing so as to define a geometric center, reflector means mounted within said housing for reflecting light produced by said lamps towards said light outlet, an incandescent light source and associated reflector located in close proximity to the geometric center of said fluorescent lamps such that the lamps encircle the light source, control means for separately and selectively controlling dimming of said incandescent light source, and temperature sensing means, connected to said fluorescent lamps and to said light source, for sensing ambient temperature and for deactivating said fluorescent lamps and activating said light source when the ambient temperature sensed by said temperature sensing means falls below a predetermined value.

\* \* \* \* \*